(12) United States Patent
Baumann et al.

(10) Patent No.: US 9,441,530 B2
(45) Date of Patent: Sep. 13, 2016

(54) CONNECTION BOX WITH CHARGING FLUID SUPPLY ARRANGEMENT FOR AN INTERNAL COMBUSTION ENGINE

(75) Inventors: Hermann Baumann, Tettnang (DE); Dominik Seiderer, München (DE); Walter Gauss, Neukirch (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 1146 days.

(21) Appl. No.: 13/459,146

(22) Filed: Apr. 28, 2012

(65) Prior Publication Data
US 2012/0325185 A1     Dec. 27, 2012

(30) Foreign Application Priority Data

May 10, 2011 (DE) .................. 10 2011 075 618

(51) Int. Cl.
*F02M 25/07* (2006.01)
*F02B 29/04* (2006.01)
*F02M 35/10* (2006.01)
*F02M 35/116* (2006.01)

(52) U.S. Cl.
CPC ....... *F02B 29/0412* (2013.01); *F02B 29/0431* (2013.01); *F02B 29/0462* (2013.01); *F02B 29/0475* (2013.01); *F02M 26/00* (2016.02); *F02M 26/19* (2016.02); *F02M 26/22* (2016.02); *F02M 35/10222* (2013.01); *F02M 35/116* (2013.01); *Y02T 10/121* (2013.01); *Y02T 10/146* (2013.01)

(58) Field of Classification Search
CPC .......... F02B 29/0412; F02B 29/0431; F02M 25/07; F02M 25/0704; F02M 25/071; F02M 25/0711; F02M 25/0712; F02M 25/0722; F02M 25/0726; F02M 25/0727
See application file for complete search history.

(56) References Cited

U.S. PATENT DOCUMENTS

| | | | |
|---|---|---|---|
| 5,957,116 A | 9/1999 | Haegele et al. | |
| 5,957,118 A | 9/1999 | Tateno et al. | |
| 6,032,634 A | 3/2000 | Minegishi et al. | |
| 6,237,336 B1 | 5/2001 | Feucht et al. | |

FOREIGN PATENT DOCUMENTS

FR     2 333 292     6/1977

*Primary Examiner* — Lindsay Low
*Assistant Examiner* — Jacob Amick
(74) *Attorney, Agent, or Firm* — Klaus J. Bach

(57) ABSTRACT

In a connection box for direct connection to a charging fluid duct of a charging fluid supply designed for intermixing a charge air and an exhaust gas to form a charging fluid, comprising a housing with a charge air connecting space including at least a connection for a charge air guide arrangement, and at least one mixing channel in communication with the charge air connecting space via a connection for supplying charge air to the mixing channel and the mixing channel including a supply side exhaust gas connection for an exhaust gas recirculation and a charging fluid-side mixing channel connection for the charging fluid duct, the connection is arranged at a first front side of the housing, and the mixing channel extends along a longitudinal side of the housing from the first front side to a second front side of the housing opposite the first front side.

20 Claims, 5 Drawing Sheets

CONNECTION BOX WITH CHARGING FLUID SUPPLY ARRANGEMENT FOR AN INTERNAL COMBUSTION ENGINE

BACKGROUND OF THE INVENTION

The invention resides in a connection box for a charging fluid supply arrangement to an internal combustion engine with at least one connection for a charge air supply line, a mixing arrangement with exhaust gas supply connections and a mixing channel.

Such a connection box is designed for a direct connection to a charging fluid line of a charging fluid supply and serves for a combination of charge air and exhaust gas to a charging fluid. It includes a housing with a charge air connecting chamber having at least one connection for a charge air supply line and at least one mixing channel in communication, via a connector charge air can be supplied to the mixing channel. The mixing channel includes a supply-side exhaust gas connection for exhaust gas recirculation and a charging fluid line-side mixing channel connection for the charge air supply line.

The invention also resides in a charging fluid supply arrangement with a connection box and with a charging fluid supply line for supplying a charging fluid consisting of charge air and recirculated exhaust gas to a combustion chamber of an internal combustion engine and with a connection box connected directly to the charge air supply line for merging the charge air and the exhaust gas in a mixing channel.

The invention further resides in an internal combustion engine provided with such a charge air and exhaust gas recirculation mixing arrangement for mixing charge air and exhaust gas supplied as charging fluid to the internal combustion engine.

In particular in connection with Diesel engines charging the engines for improved combustion of the Diesel fuel and for lower nitrogen oxide emissions in the exhaust gas has been well established. In particular for compliance with exhaust gas regulations charging is desirable. Depending on requirements, a single or double stage charging of charge air, that is, a low-pressure stage and a high-pressure stage, in particular in combination with exhaust gas recirculation, has been found expedient for taking the above aspects into consideration. Because of the high- and/or low pressure charge air flows and the exhaust gas recirculation flows the establishment of a charging arrangement however may be quite space consuming. For the individual charging stages, there is generally a turbocharger needed which includes a turbine driven by exhaust gas and a compressor for compressing the charge air and also a suitable heat exchanger is necessary for cooling the compressed charge air before it is supplied to the combustion chambers of the internal combustion engine. With a two-stage charging arrangement at least a first charge air cooler and possibly a second charge air cooler are used.

Depending on the operation, an improved result is generally achieved only if a certain percentage of exhaust gas is supplied to the charge air side following the cooling of the charge air. This result also depends on how well the exhaust gas and the charger air are mixed for forming the charging fluid supplied to the combustion chamber of an internal combustion engine. It is desirable that all cylinders of the internal combustion engine are filled with an essentially homogeneously mixed fluid of charge air and exhaust gas.

U.S. Pat. No. 6,237,336 B1 for example discloses an arrangement wherein a mixing section is disposed in a mixing chamber downstream of the charge air supply and separate from the engine block and the accessories and into which the compressed and cooled charge air and the exhaust gas are introduced and wherein they are sufficiently intermixed. This basically reasonable arrangement however is comparably space-consuming and also results in an increased flow resistance of the charging fluid to be formed in the mixing chamber.

Such a mixing chamber should mix the exhaust gas and the charge air between the injection of the exhaust gas into the charge air and the point where the charging fluid mixture enters the combustion chamber of the internal combustion engine as well as possible. And this should occur without a substantial increase in the flow resistance and particularly with the smallest possible space requirements.

U.S. Pat. No. 5,957,116 discloses a charge air supply arrangement of the type referred to above which is designed with those considerations in mind. Herein, an exhaust gas recirculation pipe is arranged in a connection box arranged in front of the manifold for guiding the charge air to the cylinder as a construction unit. The exhaust gas recirculation pipe extends longitudinally through the intake manifold and is provided with axially spaced delivery holes for supplying the exhaust gas to the charge air through the delivery holes essentially uncooled. The charge air enters the intake manifold from the top.

A problem encountered with this arrangement however is that the mixing area in the direction of the manifold is relatively short since it extends essentially transverse to the longitudinal side of an engine block if the sideward extensions of the engine block cannot be excessively large. The solution proposed in U.S. Pat. No. 5,957,116 is consequently either comparatively inefficient or it requires a large installation space. This problem is particularly difficult in connection with small internal combustion engines, especially Diesel internal combustion engines since very little space is generally available for a relatively large mixing space in the small engine application environment. As a result, the admixing of exhaust gas to the charge air as proposed by U.S. Pat. No. 5,957,117 is either comparatively space consuming or ineffective.

It is therefore an object of the present invention to W provide a connection box for a charge air admission and a charge air supply for an internal combustion engine as well as an internal combustion engine wherein the mixing of charge air and exhaust gas can be comparatively efficient and also relatively simple.

It is also an object of the invention to provide a corresponding method for mixing the charge air and the exhaust gas wherein the mixing chamber does not require an excessive amount of space but still is relatively long.

In particular, the space available along the length of an engine block should be used in an efficient way to provide a relatively long efficient mixing path for the internal combustion engine.

SUMMARY OF THE INVENTION

In a connection box for direct connection to a charging fluid duct of a charging fluid supply designed for intermixing a charge air and an exhaust gas to form a charging fluid, comprising a housing with a charge air connecting space including at least a connection for a charge air guide arrangement, and at least one mixing channel in communication with the charge air connecting space via a connection for supplying charge air via the connection from the charge air connecting space to the mixing channel and the mixing channel including a supply side exhaust gas connection for an exhaust gas recirculation and a charging fluid-side mixing channel connection for the charging fluid duct, the connection is arranged at a first front side of the housing, and the mixing channel extends along a longitudinal side of the housing from the first front side to a second front side of the housing which is disposed opposite the first front side.

The connection box is preferably connecting to charge fluid duct directly in the design unit.

Advantageously, the mixing length mentioned for mixing the charge air and the exhaust gas is so formed that it extends in the mixing channel at least from one mixing channel point at the first front side to a second mixing channel point at the second front side. Preferably, the first mixing channel point is at the location of a supply-side exhaust gas connection and/or a connection mentioned earlier. Preferably, the second mixing channel point is at a location of a charge fluid side mixing channel connection.

The invention is based on the consideration that a separate mixing section integrated into a charge air supply structure for forming a charging fluid is largely inefficient and requires a large amount of space. The inventor has found that, with a smartly selected construction space, a comparably large mixing section can be realized wherein also an efficient and simple mixing of exhaust gas and charge air is possible. The conditions suitable herefor are provided by the connection box according to the invention. Since herein the connection between the charge air connecting area and the mixing channel is arranged at a first side of the housing, in contrast to the state of the art, the mixing channel can be accommodated along the longitudinal side of the housing extending from the first front side to the second front side of the housing.

The charging fluid supply structure comprises at least one mixing channel extending along the longitudinal side of the over the length of the charge fluid line wherein each front side of the housing is oriented transverse to the longitudinal extension of the charge fluid line.

A charging fluid line, expediently together with a manifold, for charging fluid in combination with a connection box that is with a connection box connected directly to the manifold, represents basically the preferred arrangement for a charging fluid supply structure, in which a charge air, after compression and cooling, is mixed with exhaust gas in a comparatively space saving manner. Preferably, the connection box is directly, that is, expediently via sealing means or similar structures but essentially without long duct sections connected by forming a unit to the charging fluid duct (manifold. In this way, a building unit consisting of a charge fluid duct (manifold) and the connection box is formed with no need for additional duct sections.

The inventor has recognized that a mixing section which extends transverse to the longitudinal extension of the engine block cannot really fulfill the requirements in an efficient mixing process and on a space efficiency. In order to further improve the efficiency of a mixing a charge air and an exhaust gas extends preferably in a mixing channel from a first mixing section point, in particular with at least one of the supply-side connections, to a second mixing section point, in particular with a charging fluid-side connections. The mixing channel consequently may extend alongside the housing. In other words, the longitudinal side of the housing is oriented along the charging fluid duct (manifold). Furthermore, advantageously, the charging fluid duct-side mixing channel connection is assigned to, that is arranged at, a front side of the connection box opposite the first mixing section point. Preferably, the first mixing section point is arranged at a first front side of the connection box opposite the second side.

In this way, the mixing section can advantageously be sufficiently long for achieving a good mixing of the exhaust gas and the charge air. On the other hand, this is achieved without construction space disadvantages, since the mixing section extends along the longitudinal extension of the charging fluid duct, for example thereabove. The mixing section can be accommodated there in a particularly compact manner and facilitates a particularly efficient and good mixing of the charge air and the exhaust gas.

The invention also provides for an internal combustion engine with an engine block and a charging fluid supply with a charging-fluid duct for supplying a charging fluid comprising charge air and recirculated exhaust gas to a combustion chamber of the engine block of the internal combustion engine. To the charging fluid duct in the building unit, the connection box according to the invention is connected for supplying the charging fluid to the charging fluid duct. To the connection box a charge air supply, the charging fluid supply duct and an exhaust gas recirculation line are connected.

In other words, the invention provides for a connection box for supplying a charging fluid to the charging fluid duct (manifold) of the engine block wherein the mixing channel extends along the housing of the connection box so that essentially a space extending all along the engine block between the power output end and the opposite end of the internal combustion engine is available within a mixing channel. The invention provides for a comparatively simple and sufficiently long mixing section in which sufficient mixing is achieved over the length of the internal combustion engine.

The length of the mixing section after introduction of the exhaust gas, that is as measured from the first mixing section point up to the second mixing section point, provides not only for a good mixing of the charge air and the exhaust gas but can be achieved in a comparatively inexpensive manner by integration of the mixing channel into the connection box. The connection box can be arranged in a space saving manner with its front sides extending transverse to the longitudinal extension of the charging fluid duct (manifold) in particular on the top side of the internal combustion engine and extending over the length thereof.

The concept according to the invention is particularly advantageous for an internal combustion engine with two-stage charging especially in connection with exhaust gas recirculation. The crankcase of an engine with a V arrangement of the cylinder is particularly suitable for an implementation of the invention. There, the charging fluid supply structure may be arranged on top of the internal combustion engine in the space between the V arrangement of the cylinders.

The mixing channel is preferably formed integrally with the housing. In this way, the housing is particularly stable and sealed. Preferably, the mixing channel is cast onto the longitudinal side of the housing. But the mixing channel may also be formed with the housing in two parts. It may for example be mounted to the housing. In this way, the housing can be manufactured relatively easily. Also other mounting procedures for the at least one mixing channel are possible. The mounting procedures mentioned have been found to be comparatively inexpensive to providing a mixing channel together with the connection box.

The connection box has preferably the above-mentioned first and a second front side transverse to the longitudinal extension of the charge air duct (manifold). The first front side is preferably arranged opposite the power output end of the internal combustion engine. The second front side is arranged at the power output end of the internal combustion engine. Basically, however, the arrangement may be reversed.

It is advantageous if the charge air is introduced into the mixing channel at the same (for example, the first) front side as the exhaust gas. Preferably only fluid admission passages are arranged at, or near, the first front side. In addition to the so-called connection on the front side of the housing as provided in connection with the invention preferably also at least one supply-side exhaust gas connection is provided at the front side of the housing.

At the second front side preferably only fluid passages are arranged which lead away from the housing. In addition to the charging fluid duct-side mixing channel connection, the second front side of the housing includes preferably also a third connection of a charge air connecting chamber of the housing advantageously in the form of a compressor connection. In connection with the mentioned particularly advantageous embodiment, this may be a discharge connector of a charge air connection chamber at the second front side of the connection box.

The embodiment wherein at the first front side only supply passages are arranged and at the second front side only discharge passages are arranged (or vice versa) provides for a particularly simple connecting pattern which additionally is also building space efficient. In other words, it is advantageous if the first mixing section point is assigned to the first front side or, respectively, is arranged in proximity thereof. Charge air can be conducted from a first front side to the first mixing section point in the area of the first front side. This measure has been found to be preferable since this facilitates a flow of charge air on one hand and charging fluid (mixed charge air and exhaust gas) on the other hand in a parallel or, respectively, in a counter flow arrangement. Preferably, generally a counter flow arrangement is realized independently of the location of a discharge connection.

Advantageously, the second mixing section point, in particular the charging fluid-side mixing channel connection, is assigned to the second opposite front side or, respectively, is arranged in the proximity thereof. It is advantageous if the at least one discharge-side third connection is arranged as charge air connection space of the housing also at or near the second front side, or at the second front side, of the connection box. Preferably, the charge air and the charging fluid are then discharged at the same second side of the connection box. Preferably, the engine block-side space extending parallel to the mixing channel—also called the inner area—can then be used to accommodate a charge air cooler or a similar component of a charge air guide structure on the top side of the internal combustion engine.

Charge air is conducted in the charge air connecting space of the housing preferably on different sides of a separation wall in two separate charge air flows in a counter-current pattern. This makes a particularly advantageous utilization of the connection box for a charge air flow of a two-stage charging arrangement possible. Such an arrangement is shown in the drawing.

Preferably, the charging fluid can be conducted in the mixing channel after flow reversal the connection. The charging fluid is conducted in the mixing channel parallel to a first charge air flow and in a counter current pattern with respect to a second charge air flow in the charge air connecting space. This is advantageous in connection with an arrangement where at opposite sides of the separation wall charge air flows are conducted in a counter-current pattern. This results in a comparably compact charge air and charging fluid which is also thermally advantageous. For example, a heat exchange between the separated charging fluid or respectively, the charge air flow is comparatively small in spite of the compact of the connection box.

In accordance with a further embodiment of the invention, it is advantageously possible to supply the charging fluid in an already well-mixed form from the top side of the internal combustion engine to a charging fluid supply duct (manifold). The connection box is arranged preferably above the engine block for space-efficiency.

In particular in connection with an internal combustion engine with a single row of cylinders a connection box with a single mixing section has been found to be advantageous. The inventive concept is basically usable also for an internal combustion engine with only one row of cylinders. Especially for an internal combustion engine with two rows of cylinders a connection box with two rows of cylinders a connection box with two mixing section is advantageous. In a preferred further development, the connection box may be used as a support structure for additional engine components,—in particular, in connection with a two row engine block.

In connection with two mixing channels, a charge air flow guide structure which extends between a first connection of the charging fluid connecting space and the connection, can extend through the interior of the charge air connecting space which is provided in the housing between a first and a second mixing channel. This further development has been found to be particularly advantageous in connection with an internal combustion engine with a two-row engine block that is with an A-side of cylinders and a B-side of cylinders, in particular a V-arrangement of cylinders guiding the charge air from the front side to the longitudinal side of the connection box permits a center discharge of charge air from the connection box for example to a compressor disposed between a low pressure stage and a high-pressure stage.

It is further advantageous if a charge air guide structure extending between a first connection of the charge air connection box and the connection follows in the housing interior a transverse pattern leading to the longitudinal side. In particular, a charge air guide structure extending between a first connection of the charge air connecting space and a third connection may follow essentially an axial path in the interior of the housing leading to the front side center. With the mentioned transverse extension an advantageous distribution of the charge air to the two longitudinal sides of the connection box is obtained of which in each case one is assigned to a longitudinal side of the engine block. A transverse extension wherein the charge air guide structure extends along a housing diagonal or along a front side of the housing has been found to be advantageous.

In the above preferred embodiment of the charge fluid supply to a two row internal combustion engine, a transverse extension of the charge air guide structure leads in each case to a first center section point on a first and a second longitudinal side of the housing of the connection box wherein the first longitudinal side is assigned to an A-side of the internal combustion engine and the second side is assigned to a B-side of the internal combustion engine. The transverse extension starts particularly at an axis of the interior of the charge air connecting space or, alternatively at a front side center of the housing. The transverse distances to the A and B sides are therefore essentially the same. This results in an advantage with respect to a uniform pressure distribution of charge air for the A and B sides of the internal combustion engine.

In particular in connection with the above-mentioned further development at least one supply side exhaust gas connection of the housing provided at or near the first front side of the connection box has been found to be advantageous. In this way, the exhaust gas is introduced into the connection box adjacent the first front side practically at the first mixing section point. Preferably, the location of the exhaust gas injection defines the first mixing section point that is it defines the beginning of the mixing section in a mixing channel.

Preferably, a first and a second connection of a connecting chamber form in the housing an upper cooler connection and a lower cooler connection to a first and a second charge air cooler, for example, a low pressure charge air cooler and a high pressure charge air cooler. Preferably, the housing of the connection box includes support means for a charge air cooler arranged above the connection box and/or a bottom connecting flange for a charge air cooler arranged below the connection box. In particular a charge air guide structure in the housing of the connection box guides the charge air from a charge air cooler in discharge direction that is in the housing cooled charge air is guided. This results advantageously in a reduction of material tensions in the housing.

An additional lower connection box preferably includes a bottom side connecting flange for its installation above the crankcase of the internal combustion engine. The additional lower connection box can be mounted advantageously directly on the crankcase. Preferably, the housing of the lower connection box includes a lower opening. This opening is specifically arranged in the cross-section of the lower side connecting flange. It can advantageously be utilized to form with the crankcase a bottom housing wall in the opening cross-section of the lower connection box. The lower connection box can use the crankcase of the internal combustion engine to form a charge air guide structure up to the first mixing section point thereby saving material. An additional upper connection box may also be provided which may also form a cover for the connection box below.

Exemplary embodiments of the invention will be described below on the basis of the accompanying drawings. The drawings are not intended to represent the exemplary embodiments in seals but rather serve as explanations and therefore are schematic figures. With regard additions to charge direction that is in the housing cooled charge air is guided. This results advantageously in a reduction of material tensions in the housing.

An additional lower connection box preferably includes a bottom side connecting flange for its installation above the crankcase of the internal combustion engine. The additional lower connection box can be mounted advantageously directly to the crankcase. Preferably, the housing of the lower connection box includes a lower opening. This opening is specifically arranged in the cross-section of the lower side connecting flange. It can advantageously be utilized to form with the crankcase a bottom housing wall in the opening cross-section of the lower connection box. The lower connection box can use the crankcase of the internal combustion engine to form a charge air guide structure up to the first mixing section point thereby saving material. An additional upper connection box may also be provided which may also form a cover for the connection box below.

Exemplary embodiments of the invention will be described below on the basis of the accompanying drawings. The drawings are not intended to represent the exemplary embodiments in seal but rather serve as explanations and therefore are schematic figures. With regard to additions to teachings recognizable from the drawings, reference is made to the respective state of the art. It is to be taken into consideration that various modifications and changes with respect to form and details of an embodiment can be made without departing from the inventive concept. The features as disclosed in the description and the drawings and in the claims may be essential individually or in any combination for further development of the invention. All combinations of at least two features of the description, the drawings and/or the claims are considered to be within the scope of the invention. The general concept of the invention is not limited to the exact shape or detail of the preferred embodiment shown and described below, or limited to an object which would be limited in comparison with the claimed subject matter. For simplification below the same reference numerals are used for identical or similar parts or components with identical or similar functions.

Advantages, features and particulars of the invention will become apparent from the following description of a preferred exemplary embodiment with reference to the accompanying drawings.

DESCRIPTION OF A PARTICULAR EMBODIMENT

Figure 1:
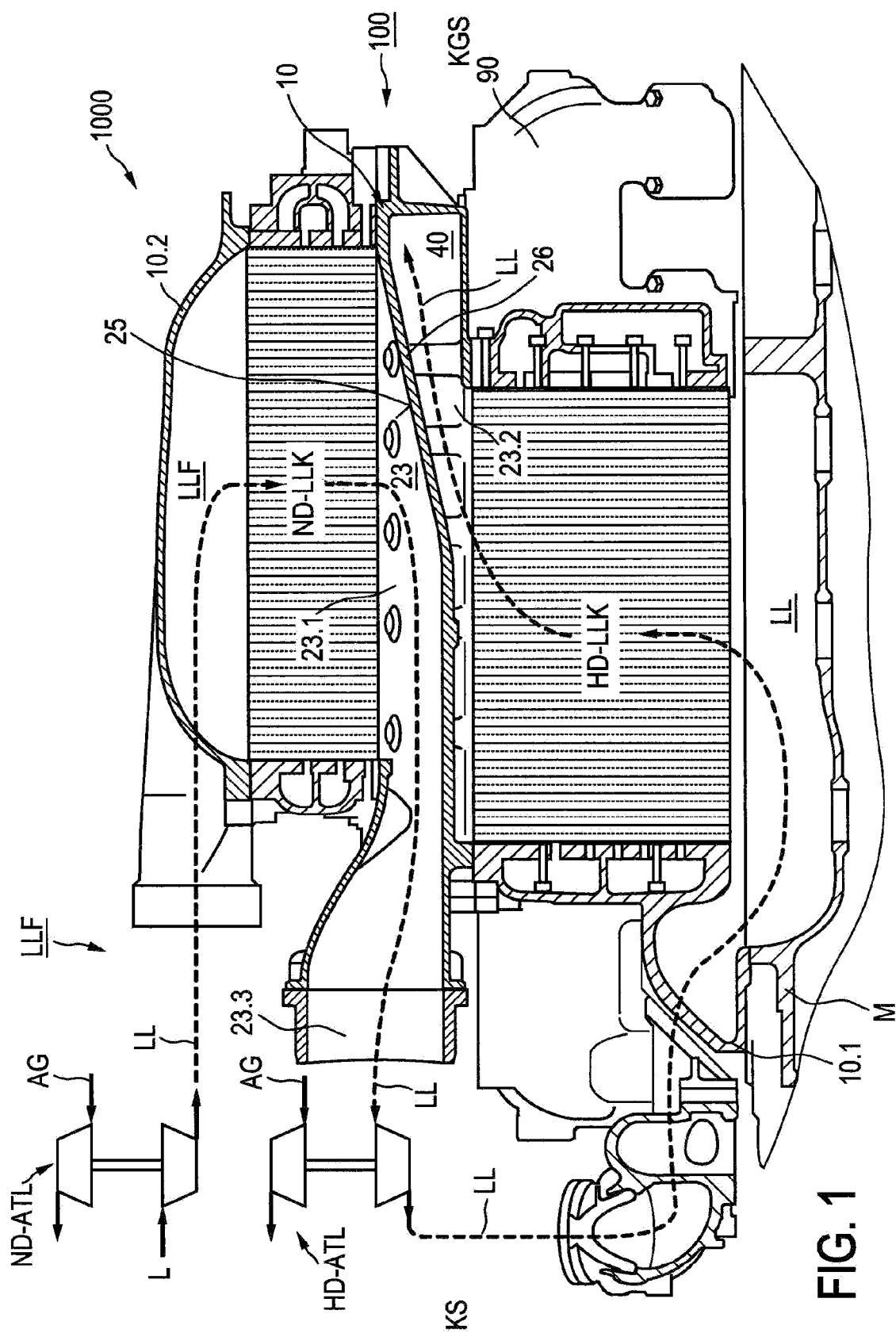
FIG. 1 shows an internal combustion engine with a charging fluid supply and a connection box according to a particularly preferred design in connection with a charging arrangement of the internal combustion engine in a cross-sectional side view.
Figure 2:
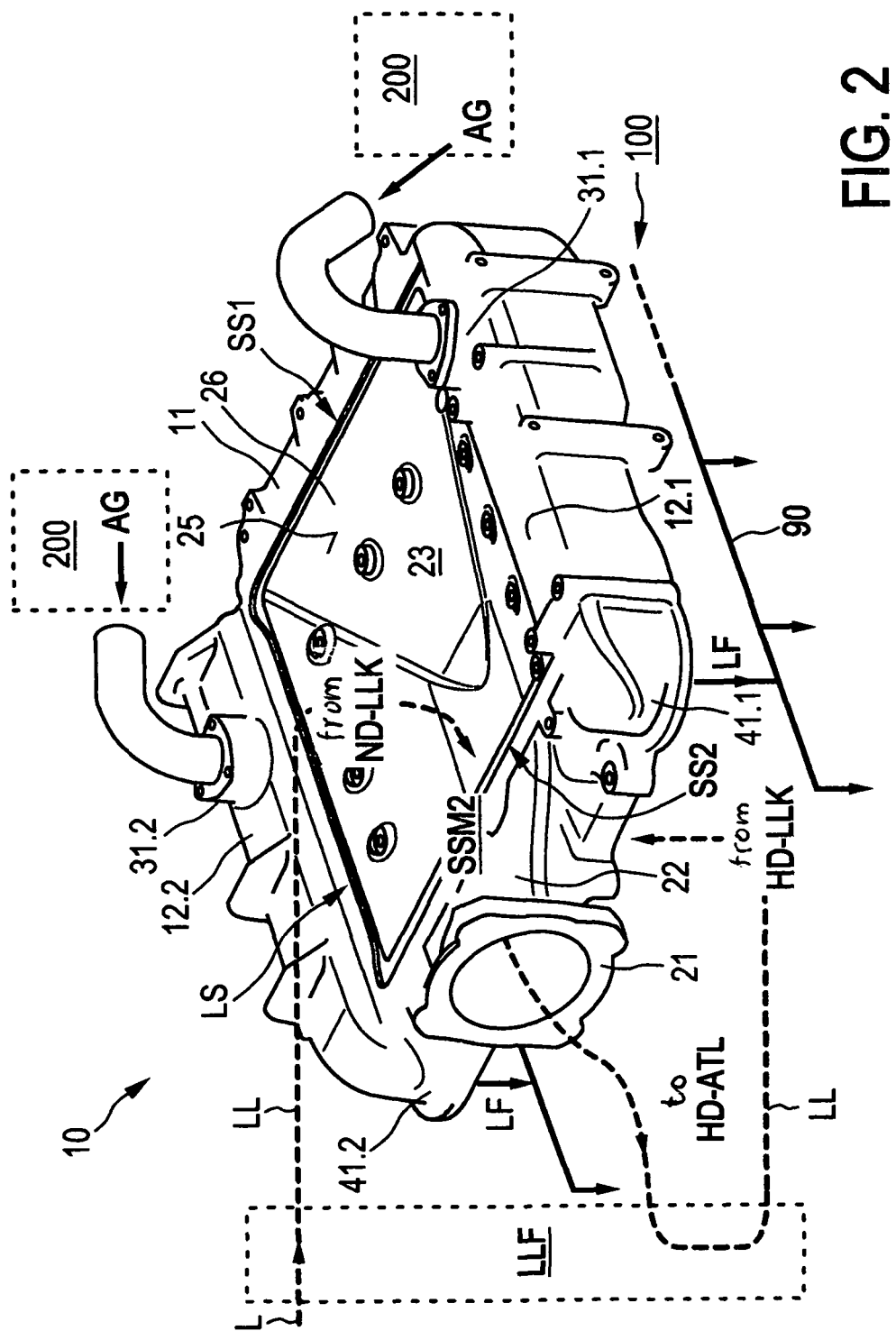
FIG. 2 shows the connection box of FIG. 1 in perspective view as seen from above.
Figure 3:
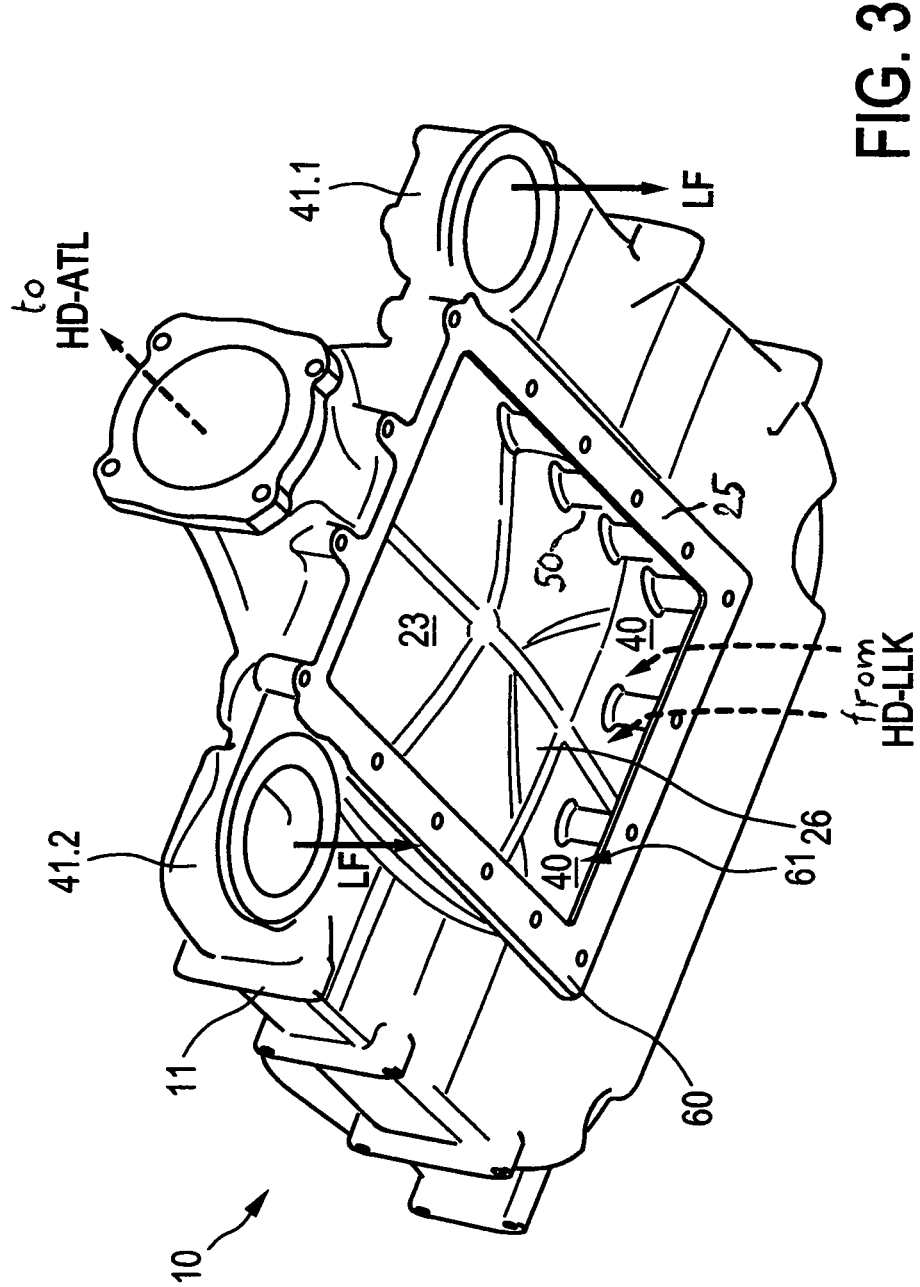
FIG. 3 is a perspective bottom view of the connection box of FIG. 1.

FIG. 1 shows an internal combustion engine 1000 with a motor block M and two-stage charging by means of a low pressure exhaust gas turbocharger ND-ATL and a high-pressure exhaust gas turbocharger HD-ATL. Fresh air L is compressed in the low pressure exhaust gas turbocharger ND-ATL by a low-pressure compressor LL and supplied to a charge air guide arrangement LLF. In the charge air guide arrangement LLF, a low pressure charge air cooler ND-LLK is arranged in which the compressed charge air LL is cooled and then supplied to a high pressure compressor of a high pressure turbocharger HD-ATL. Further, the charge air LL is then supplied to a high pressure charge air cooler HD-LLK. Finally, the charge air LL leaves the charge air guide arrangement LLF to a charge fluid supply 100 specifically to enter a charging a fluid duct 90 to which also recirculated exhaust gas is supplied. Ahead of the charging fluid duct is a mixing channel 12.1, 12.2 which is described in connection with FIGS. 2 - 5 and which is disposed in a connection box 10 disposed adjacent the connecting area 40. In the mixing channel 12.1, 12.2, here in a first and a second mixing channel 12.1, 12.2, in each case a mixing section MS is provided for a thorough mixing of the charge air LL and the exhaust gas AG to form the charging fluid LF.

The connection box 10 is in the shown embodiment part of a housing arrangement for the charging group including a low pressure charge air cooler ND-LLK and the high pressure charge air cooler HD-LLK. The housing arrangement consists here—from the top to bottom—of an upper connection box 10.2 which forms a cover and is disposed on top of a containment housing for the low pressure charge air cooler ND-LLK. The containment housing and the low pressure charge air cooler ND-LLK are supported by the connection box 10. The connection box 10 itself is disposed on a container housing which is not marked and on the high pressure charge air cooler HD-LLK. The container housing and the high-pressure charge air cooler HD-LLK again are disposed on a lower connection box 10.1, which forms, in any case, partially together with a housing part of the engine block M, a part of the charge air guide structure LLF between the high pressure compressor of the high pressure exhaust gas turbocharger HD-ATL and the high-pressure charge air cooler HD-LLK.

By a connecting flange 60 (FIG. 3) at the bottom side of the housing 11, the connection box 10 is mounted directly on top of the high pressure charge air cooler HD-LLK or the container thereof which is not marked. The connection box 10 is mounted with its bottom side connecting flange 60 to the upper side of the high pressure charge air cooler HD-LLK. As shown the connection box has within the connecting flange 60, an opening 61 leading to the interior 24 of the housing 11. Upon mounting of the connection box 10 onto the top side of the high pressure charge air cooler HD-LKK, the opening 61 is closed by a sealing jointure of the connecting flange 60 to the containment of the high pressure charge air cooler HD-LLK. The interior 24 of the housing 11 is then connected with its under side to the high-pressure charge air cooler HD-LLK and the lower connection box 10.2, so that the charge air LL is guided partially adjacent the crankcase of the engine block 200 is essentially along the charger air structure LLF from the lower connection box 10.2 to the connection box 10.

Additional components of a charging system are disposed on the top side of the connection box 10 by means of support means. The support means 50 are disposed on the recessive wall 25 which supports the guide structure for the charge air LL, that is, on the top side of the separating wall 26, which faces the section of the charge air connection space 23 above the separation wall or respectively the housing 11. The support means 50 support the low pressure charge air cooler ND-LLK is disposed on a flange-like edge of the recessive wall 25.

The charge air LL is conducted in the connection box a first partial flow in the section above the separating wall 26 (from the low pressure charge air cooler ND-LLK) and as a second partial flow in the section below the separation wall (from the high pressure charge air cooler HD-LLK) in a counter current flow pattern. The charge air LL in the charge air connecting space 23 on one hand and the charge fluid LF (the exhaust gas AG mixing in the charge air LL) in the mixing channel 12.1, 12.2 on the other hand are therefore conducted in parallel countercurrent flows which is apparent from the following description of FIGS. 2 to 5.

FIGS. 2 to 5 show in different representations, the construction details of the connection box 10 for use within the charge air guide arrangement LLF as described in connection with FIG. 1. Below, reference is made to the FIGS. 2-5 such they represent the connection box with different views and cross-sections in order to clearly show the charging fluid supply 100. The connection box 10 serves here as a direct connection to the charge fluid duct 90 of the crankcase of an engine block M of the internal combustion engine 1000 as shown in FIG. 1.

The connection box 10 comprises a housing 11 and, in the present case, two mixing channels 12.1, 12.2. The first and second mixing channels 12.1, 12.2 are each cast to one longitudinal side LS of the housing 11 and extend each from a first front side SS1 to a second front side SS2 of the housing 11. The housing 11 itself includes at the second front side SS2, a third connection 23.1 of a charge air connecting space 23, which—as shown in FIG. 1—is in the form of a compressor connection. Via this connection charge air LL is supplied from the section of the charge air connecting space 23 disposed above the separating wall 26 to a compressor of the high pressure exhaust gas turbocharger HD-ATL which is part of the charge air guide arrangement symbolically shown in FIG. 2.

The charge air can be supplied to the section of the charge air connecting space 23 disposed in the housing 11 above the separating wall 26 in an already compressed, cooled state. The section above the separation wall 26 which is characterized by the recessive wall 25 is reached by the charge air arriving from the low pressure charge air cooler ND-LLK. Via the diffuser 22, the charge air is conducted from the connection box 10, that is, from the second front side SS2 of the housing 11 outwardly to the charge air guide arrangement LLF and then via the high-pressure charge air cooler HD-LLM again to the housing 11. To this end, the charge air flows via the connecting flange 60 (FIG. 2) at the lower second connection 23.2 into the section of the charge air connecting space 23 via the connecting flange 60 shown in FIG. 3 at the lower second connection 23.2 below the separating wall 26.

Figure 4:
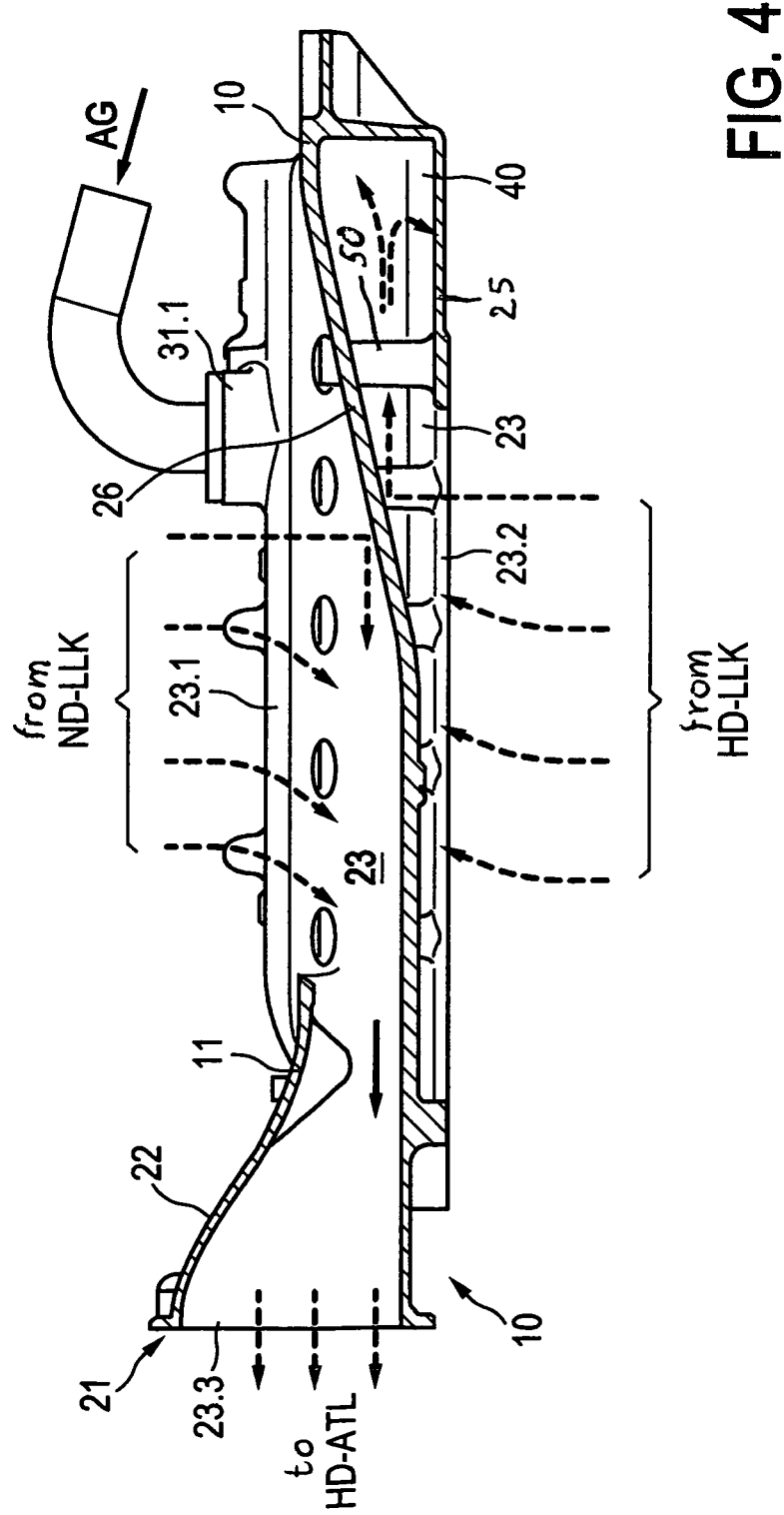
FIG. 4 shows the connection box of FIG. 1 in a sectional side views and FIG. 5 is a top view of the connection box in section.
Figure 5:
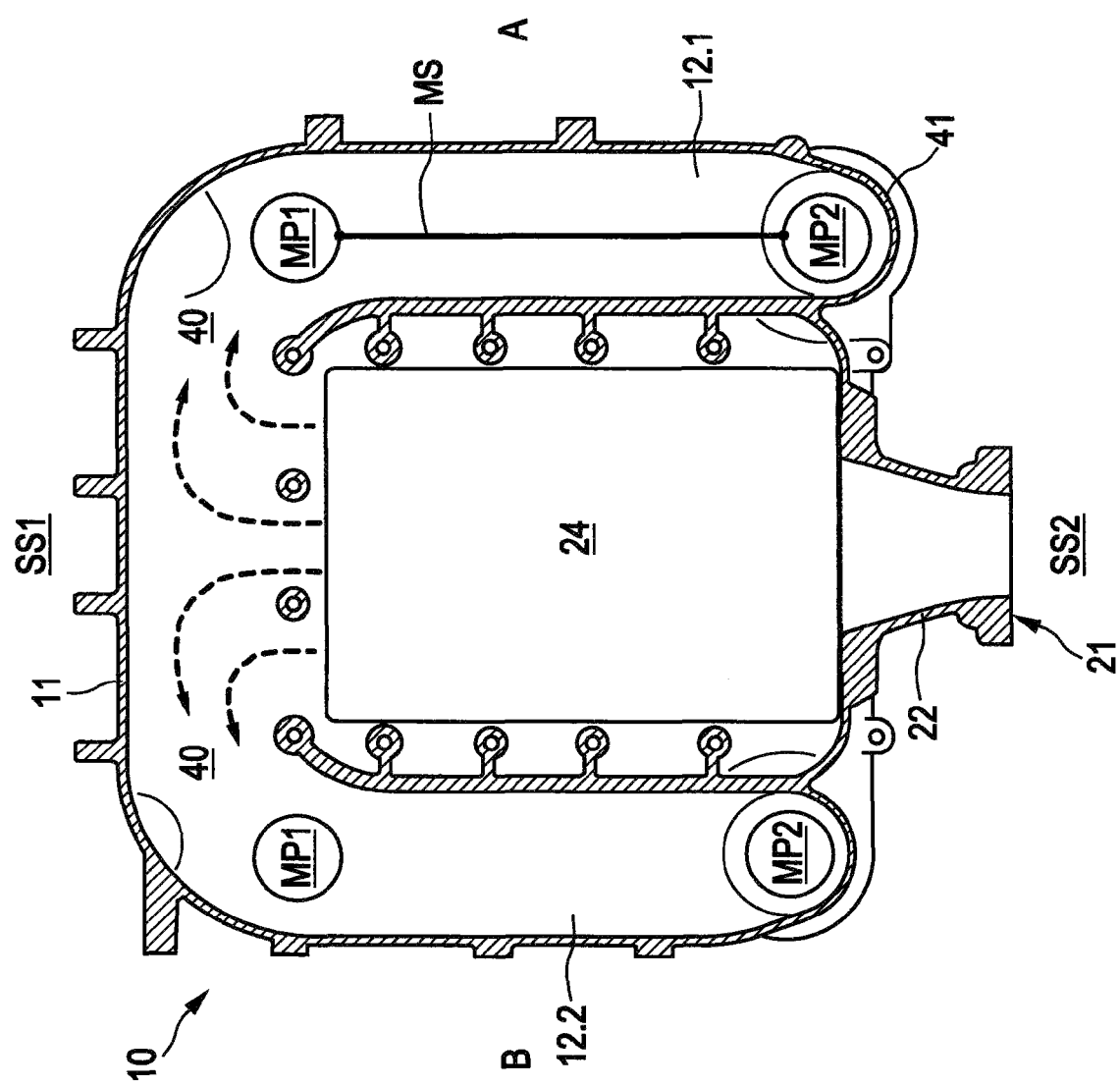

From there—as apparent particularly from FIGS. 4 and 5—the charge air reaches, after re-direction at the connecting area 40, the first front side SS1 of the housing 11. The connecting area 40 is arranged at the first front side SS1 of the housing 11 and interconnects via a channel visible in FIG. 5 and extending along the first front side SS1 a section of the charge air connecting space 23 below the separation wall 26 and the first as well as the second mixing channel 12.1, 12.2. The charge air connecting space 23 is disposed in the interior of the housing 11 between the two parallel mixing channels 12.1. 12.2 arranged along the sides of the housing 11. By means of the above-mentioned recessive wall area 25 in the separation wall 26 a favorable low resistance in flow pattern for the charge air LL into the channel-like connection along the first front side SS1 of the housing as marked by arrows is achieved.

As a result, this leads to a charge air flow pattern from the second front side SS2 in a transverse direction about along a housing half diagonal as indicated in FIG. 4. The charge air LL is distributed to the longitudinal sides LS of the housing 11 into the mixing channels 12.1, 12.2. Actually, there is a transverse flow of the charge air LL starting from a front center side SS M@ at the second front side SS2 to the longitudinal side LS of the housing 11 in the area of the first front side SS1. Herein, the first and second longitudinal side LS assigned to or is one of the sides designated in FIG. 5 A- and B sides of the engine block M. As a result, the charge air LL is guided as indicated in FIGS. 4 and 5 by arrows from the second front side SS2 of the housing 11 to the two longitudinal sides LS of the housing 11.

Then the charge air is guided—while leaving the interior 24 of the housing—at a first mixing section point MP1, that is the beginning of the mixing section MS, into a mixing channel 12.1, 12.2 arranged alongside the housing as shown in FIG. 5.

Each of the longitudinal mixing channels 12.1, 12.2 has a charging fluid duct side mixing channel connection 41.1, 41.2, which in this embodiment is in the form of a connecting flange. The mixing channel connection 41.1, 41.2 defines a second mixing section point MP2 as the end of the mixing section MS in the mixing channel 12.1, 12.2. Exhaust gas AG is mixed with charge air LL in the first and second mixing channels 12.1, 12.2 and also in the charge fluid duct 90 shown in FIGS. 1 and 2. Each of the mixing channels 12.1, 12.2 provides for a good and homogeneous mixing of the exhaust gas AG and the charge air LL already before the charging fluid enters via the mixing channel connection 41.1 the charge fluid duct 90, which in the form of a manifold leads the charging fluid to the respective cylinders. The exhaust gas is herein supplied from an exhaust gas supply connection to which an exhaust gas recirculation line (AGR) 200 is connected to be admitted to charge air in the mixing channel 12.1, 12.2 at the first mixing section point MP1 of the mixing section. FIG. 4 shows additionally a pipe for adding exhaust gas AG to the charging fluid supply line 100. The point of injection of the exhaust gas AG via the supply-side exhaust gas connection 31.1, 31.2 is at the first mixing section point MP1 of the mixing section which is shown in FIG. 5. The charge air LL and the exhaust gas AG are conducted together in the mixing channel 12.1, 12.2 to the second mixing section point MP2 at the manifold connection 41.1, 41.2. In this way, a mixing distance along the housing 11 and a mixing length along a longitudinal extension of the charging fluid duct 90 is provided for as shown in FIG. 5. The mixing distance MS extending along the mixing channel 12.1, 12.2 extends essentially from an exhaust gas connection 31.1, 31.2 in the areas of the first front side SS1 of the charging fluid supply duct 100 to the charging fluid duct side mixing channel connection 41.1, 41.2 in the area of the second front side SS2 of the charging fluid supply 100. As a result, the mixing section MS in the mixing channel 12.1, 12.2 extends along the housing 11 and along a row of cylinders at the A side and the B side of the engine block. The concept realized in the design of the connection box 10 of a mixing channel 12.1, 12.2 arranged alongside the engine results in the possibility of providing a relatively long mixing section as sufficient installation space is available alongside the engine also in connection with relatively small engines.

From a simulation of stream lines of a charge air, an exhaust gas and the mixed charging fluid including charge air and exhaust gas representations of the flow for the charging fluid supply duct of FIGS. 1-5 can be obtained which are indicative of an exhaust gas content in the charging fluid depending on the location of the charging fluid supply duct. For example, the actual mass content of exhaust gas in the charging fluid LF and the flow in a stream line representation can be indicated. With such simulations and tests the superior mixing quality of the charging fluid guide arrangement according to the invention can be proved. Finally, the concept of the invention ensures that practically the full length of an engine from the power output end KS to the opposite and KGS of an internal combustion engine 1000 is available to form a mixing section MS in the mixing channel 12 along the housing 11. A charge air supply guide structure 100 as a building unit comprising the connection box 10 and the charge fluid together facilitates the establishment of an advantageous flow of the charge air LL and the exhaust gas AG in the charging fluid LF. With the arrangement of the mixing section MS in the present embodiment, a practically complete and homogeneous mixing of exhaust gas AG and charge air LL in the connection box, that is, in the housing 11 and alongside in the mixing channels 12, is achieved. This is achieved already before the charging fluid LF is supplied to the manifold connection 41 of the charging fluid duct 90. This results in a substantial improvement of the charging fluid quality in the combustion chambers of the engine block 200 of the internal combustion engine 1000. The efficiency of combustion in the combustion chambers of the internal combustion engine 1000 is substantially increased. As a result, the power output of the 12 engine 1000 is increased and exhaust gas emissions are reduced.

REFERENCE LIST

| | |
|---|---|
| 1000 | Internal combustion engine |
| 90 | Charging fluid duct |
| 10, 10.1, 10.2 | Connection box, upper, lower |
| 100 | Charging fluid supply |
| 200 | Exhaust gas recirculation |
| M | Engine block |
| AG | Exhaust gas |
| LS | Longitudinal side |
| LL | Charge air |
| L | Fresh air |
| LF | Charging fluid |
| LLF | Charge air guide arrangement |
| SS1 | First front side |
| SS2 | Second front side |
| MP1 | First mixing section point |
| MP2 | Second mixing section point |
| MS | Mixing section |
| SSm2 | Front center side |
| KS | Power output end |
| HD-ATL | High pressure exhaust gas turbocharger |
| ND-LLK | Low pressure charge air cooler |
| HD-LLK | High pressure charge air cooler |
| KGS | Engine opposite side |
| 11 | Housing |
| 12.1, 12.2 | Mixing channel |
| 21 | Flange |
| 22 | Diffuser |
| 23 | Charge air connecting space |
| 23.1, 23.2, 23.3 | First, second, third cooling connection |
| 24 | Interior |
| 25 | Recessive wall |
| 26 | Separating wall |
| 31.1, 31.2 | Exhaust gas connection |
| 40 | Connecting area |
| 41.1, 41.2 | Mixing channel connection |
| 50 | Support means |
| 60 | Connecting flange |
| 61 | opening |

What is claimed is:

1. A connection box (10) for direct connection to a charging fluid duct (90) of a charging fluid supply (100) designed for intermixing a charge air (LL) and an exhaust gas (AG) to form a charging fluid (LF) for an internal combustion engine, the connection box (10) comprising:
a housing (11) with
a charge air connecting space (23) including at least a connection (23.1, 23.2, 23.3) for a charge air guide arrangement (LLF), and
at least one mixing channel (12.1, 12.2) in communication with the charge air connecting space (23) via a connection (40) for supplying charge air (LL) via the connection (40) from the charge air connecting space (23) to the at least one mixing channel (12.1, 12.2), and the at least one mixing channel (12.1, 12.2) including a supply side exhaust gas connection (31.1, 31.2) for an exhaust gas recirculation (200) and a charging fluid-side mixing channel connection (41.1, 41.2) for the charging fluid duct (90), the connection (40) being arranged at a first front side (SS1) of the housing (11), and the at least one mixing channel (12.1, 12.2) extending along a longitudinal side (LS) of the housing (11) from the first front side (SS1) to a second front side (SS2) of the housing (11) which is disposed opposite the first front side (SS1).

2. The connect ion box (10) according to claim 1, wherein at the first front side (SS1) only fluid supply connections are provided and at the second front side (SS2) only fluid exit connections (23.3, 41.1, 41.2) are arranged.

3. The connection box according to claim 1, wherein the charging fluid line-side mixing channel connection (41,1, 41.2) is arranged at the second front side (SS2) of the housing (11).

4. The connection box according to claim 1, wherein the mixing channel (12) is one of formed integrally with the housing (11) and mounted to the housing (11).

5. The connection box according to claim 1, wherein the charge air (LL) is conducted in the charge air connecting space (23) of the housing (11) along opposite sides of a separation wall (26) with two charger air flows in a counter-flow pattern.

6. The connection box according to claim 5, wherein the charging fluid (LF) in the mixing channel (12) is accommodated in a first mixing channel (12) provided after reversal at the connection (40) to a second charge air channel leading in a parallel counter flow to the first charge air LL flow in the charge air connection space (23).

7. The connection box according to claim 1, wherein the charge air guide arrangement (LLF), which extends between a first connection (23.1) of the charge air connecting space (23) and the connection (40) via an interior (24) of the housing (11), is arranged in the housing (11) between the first and a second mixing channel (12.1, 12.2).

8. The connection box according to claim 1, wherein the at least one supply-side exhaust gas connection (31) is arranged at the first front side (SS1) of the housing (11).

9. The connection box according to claim 1, wherein a third connection (23.3) of the charge air connection space (23) forms a compressor connection at a second front side (SS2) of the housing (11).

10. The connection box according to claim 1, wherein a first and a second connection (23.1, 23.2) of an upper cooler connection (23.1, 23.2) and a lower cooler connection provide for communication with a low pressure and a high pressure charge air cooler (ND-LLK, HD-LLK).

11. The connection box according to claim 10, wherein the low pressure charge air cooler (ND-LLK) is supported above the housing (11) and the housing (11) has an underside flange (60) for a connection to the high pressure charge air cooler (HD-LLK) arranged below the housing (11).

12. A charging fluid supply including a charging fluid (LF) duct (90) for supplying fluid comprising a mixture of charge air (LL) and recirculated exhaust gas (AG) to a combustion chamber of an internal combustion engine (1000) and a connection box (11) connected directly to the charging fluid duct (90) so as to form a construction unit for joining the charge air (LL) and the exhaust gas (AG), the connection box (10) providing for direct connection to a charging fluid duct (90) of a charging fluid supply (100) designed for intermixing a charge air (LL) and an exhaust gas (AG) to form a charging fluid (LF), comprising:

a housing (11) with a charge air connecting space (23) including at least one connection (23.1, 23.2, 23.3) for a charge air guide arrangement (LLF), and at least one mixing channel (12.1, 12.2) in communication with the charge air connecting space (23) via a connection (40) for supplying charge air (LL) via the connection (40) from the charge air connecting space (23) to the at least one mixing channel (12.1, 12.2) and the mixing channel (12.1, 12.2) including a supply side exhaust gas connection (31.1, 31.2) for an exhaust gas recirculation (200) and a charging fluid-side mixing channel connection (41.1, 41.2) for the charging fluid duct (90), wherein the connection (40) is arranged at a first front side (SS1) of the housing (11), and the mixing channel (12.1, 12.2) extends along a longitudinal side (LS) of the housing (11) from the first front side (SS1) to a second front side (SS2) of the housing (11) which is disposed opposite the first front side (SS1), the at least one mixing channel (12.1, 12.2) extending along a longitudinal side (LS) of the housing (11) which is oriented in the longitudinal direction of the charging fluid duct (90) and each front side (SS1, SS2) of the housing (11) extending transversely to a longitudinal direction of the charging fluid duct (90).

13. The charging fluid supply (100) according to claim 12, wherein for forming a charge air guide arrangement (LLF) the at least one connection (23.1, 23.2, 23.3) of the charge air connection space (23) is connected to a first and a second charge air cooler (ND-LLk, HD-LLK) and to a connection to a charge air compressor of an exhaust gas turbocharger (ND-ATL, HD-ATL) and the at least one mixing channel (12.1, 12.2) is in fluid communication with the charge air connection space (23).

14. The charging fluid supply according to claim 13, wherein the charge air guide arrangement (LLF) extends in the interior (24) of the housing (11) through the first and the second charge air cooler (ND-LLK, HD-LLK).

15. An internal combustion engine (1000) comprising:

an engine block (M)

a charging fluid supply (100) with a charging fluid duct (90) for supplying a charging fluid (LF) consisting of charge air (LL) and recirculated exhaust gas (AG) to a combustion chamber of the internal combustion engine (1000), a connection box (10) for direct connection to a charging fluid duct (90) of a charging fluid supply (100) designed for intermixing a charge air (LL) and an exhaust gas (AG) to form a charging fluid (LF), comprising:

a housing (11) with a charge air connecting space (23) including at least a connection (23.1, 23.2, 23.3) for a charge air guide arrangement (LLF), and at least one mixing channel (12.1, 12.2) in communication with the charge air connecting space (23) via a connection (40) for supplying charge air (LL) via the connection (40) from the charge air connecting space (23) to the at least one mixing channel (12.1, 12.2) and the mixing channel (12.1, 12.2) including a supply side exhaust gas connection (31.1, 31.2) for an exhaust gas recirculation (200) and a charging fluid-side mixing channel connection (41.1, 41.2) for the charging fluid duct (90), the connection (40) being arranged at a first front side (SS1) of the housing (11), and the mixing channel (12.1, 12.2) extending along a longitudinal side (LS) of the housing (11) from the first front side (SS1) to a second front side (SS2) of the housing (11) which is disposed opposite the first front side (SS1) and a charge air guide arrangement (LLF), the charging fluid supply (100) and an exhaust gas recirculation line (200) being connected to the connection box (10).

16. The internal combustion engine according to claim 15, wherein the charge air supply LLF leads to a mixing channel (12.1, 12.2) disposed on a first and on a second longitudinal side (LS) of the housing (11) wherein the first longitudinal side being disposed at an A side and the second longitudinal side being disposed at a B side of the internal combustion engine.

17. The internal combustion engine according to claim 15, wherein the charge air guide arrangement LLF includes a two-stage charging arrangement and having a first and a second charge air cooler (ND-LLK, HD-LLK).

18. The internal combustion engine according to claim 15, wherein the internal combustion engine is a V-type engine with cylinder rows arranged in V-form and the connection box (10) is disposed on the topside of the engine in the space formed between the V-arrangement of the cylinders.

19. The internal combustion engine according to claim 15, wherein an additional connection box (10.1) is mounted below the connection box (10) and immediately above the engine block M and for forming a bottom wall, the additional connection box (10.1) having a bottom opening and being sealingly connected to the engine block.

20. The internal combustion engine according to claim 19, wherein a further connection box (10.2) is arranged on top of the connection box (10) and forms a cover of the connection box (10).

* * * * *